US012365104B2

(12) United States Patent
Zhang et al.

(10) Patent No.: US 12,365,104 B2
(45) Date of Patent: Jul. 22, 2025

(54) KNIFE WITH BLADE STORAGE

(71) Applicant: Milwaukee Electric Tool Corporation, Brookfield, WI (US)

(72) Inventors: Niqi Zhang, Huarong (CN); Andrew M. Tuchscherer, Wauwatosa, WI (US); Scott M. Hangartner, Hartland, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 261 days.

(21) Appl. No.: 17/222,587

(22) Filed: Apr. 5, 2021

(65) Prior Publication Data

US 2021/0276206 A1 Sep. 9, 2021

Related U.S. Application Data

(63) Continuation of application No. PCT/CN2021/078368, filed on Mar. 1, 2021.

(60) Provisional application No. 62/986,134, filed on Mar. 6, 2020.

(51) Int. Cl.
*B26B 5/00* (2006.01)
*B25G 1/08* (2006.01)
*B26B 11/00* (2006.01)

(52) U.S. Cl.
CPC .................. *B26B 5/00* (2013.01); *B25G 1/08* (2013.01); *B26B 11/00* (2013.01)

(58) Field of Classification Search
CPC .............. B26B 5/00; B26B 11/00; B25G 1/08
USPC ............................................................... 7/118
See application file for complete search history.

(56) References Cited

U.S. PATENT DOCUMENTS

| | | | | |
|---|---|---|---|---|
| 23,975 | A | 5/1859 | Belcher | |
| 226,910 | A | 4/1880 | Fkiebertshauser | |
| 645,563 | A | 3/1900 | Heath | |
| 988,068 | A * | 3/1911 | Beardsley et al. | B26B 1/046 30/152 |
| 1,599,604 | A | 9/1926 | Wetmore | |
| 1,701,027 | A | 2/1929 | Brown | |
| 1,769,093 | A | 7/1930 | Wuesthoff | |
| 1,803,899 | A | 5/1931 | Fuller | |
| 1,940,855 | A | 12/1933 | Friedman | |
| 2,017,320 | A | 10/1935 | Mercer | |

(Continued)

FOREIGN PATENT DOCUMENTS

| | | | |
|---|---|---|---|
| CN | 1162518 | A | 10/1997 |
| CN | 2749642 | | 1/2006 |

(Continued)

OTHER PUBLICATIONS

Notice of Allowance from the United States Patent and Trademark Office for U.S. Appl. No. 29/530,343 dated Jul. 15, 2016 (9 pages).

(Continued)

*Primary Examiner* — Hadi Shakeri
(74) *Attorney, Agent, or Firm* — Reinhart Boerner Van Deuren s.c.

(57) ABSTRACT

A knife with a replacement blade stored within the knife is provided. The knife allows the replacement blade to be easily and quickly accessible. An arm is movable between a locked and unlocked position. In the locked position the arm interfaces with the replacement blade to restrain the replacement blade from being removed.

20 Claims, 3 Drawing Sheets

(56) References Cited

U.S. PATENT DOCUMENTS 2,051,721 A 8/1936 Kriangelos
2,052,741 A 9/1936 Bersted
2,628,423 A 2/1953 Cuntz
2,679,100 A 5/1954 Ehler
2,709,299 A 5/1955 Vizza
2,814,108 A 11/1957 Bassett
2,839,831 A 6/1958 Baer
2,980,996 A * 4/1961 Beran .................... B26B 11/00 7/118
3,171,201 A 3/1965 Carifi
3,604,113 A 9/1971 Cuscovitch
3,651,571 A 3/1972 Neale
3,845,554 A 11/1974 Joanis et al.
3,857,176 A 12/1974 Quenot
3,872,591 A 3/1975 Quenot
3,906,625 A 9/1975 Gringer
4,068,375 A 1/1978 Rathbun et al.
4,240,201 A 12/1980 Sawby et al.
4,292,738 A 10/1981 Osada
4,347,665 A 9/1982 Glesser
4,541,175 A 9/1985 Boyd et al.
4,551,917 A 11/1985 Walker
4,660,284 A 4/1987 Decarolis
4,670,984 A 6/1987 Rickard
4,706,385 A 11/1987 Iten
4,713,884 A 12/1987 Dunnagan
4,730,394 A 3/1988 Sonner, Jr.
4,750,267 A 6/1988 Boyd
4,773,159 A 9/1988 Casazza, Jr.
D299,413 S 1/1989 Decarolis
4,901,439 A 2/1990 Boyd, Jr.
4,918,820 A 4/1990 Korb et al.
4,922,614 A 5/1990 Machida
4,936,014 A 6/1990 Shaanan et al.
5,029,354 A 7/1991 Boyd, Jr. et al.
5,092,045 A 3/1992 Boyd, Jr. et al.
5,299,357 A 4/1994 Wonderley et al.
5,325,588 A 7/1994 Rogers
5,327,651 A 7/1994 Favreau
5,379,492 A 1/1995 Glesser
5,386,632 A 2/1995 Schmidt
5,425,175 A 6/1995 Rogers
5,426,855 A 6/1995 Keklak et al.
5,495,674 A 3/1996 Taylor, Jr.
5,513,405 A 5/1996 Bradbury, Jr. et al.
5,546,662 A 8/1996 Seber et al.
5,561,906 A 10/1996 Desmarais
5,572,793 A 11/1996 Collins et al.
5,613,300 A * 3/1997 Schmidt ................ B26B 27/005 30/162
5,644,843 A 7/1997 Young
5,704,129 A 1/1998 Glesser
5,722,168 A 3/1998 Huang
5,755,035 A 5/1998 Weatherly
5,765,247 A 6/1998 Seber et al.
5,769,094 A 6/1998 Jenkins, Jr. et al.
5,794,346 A 8/1998 Seber et al.
5,815,927 A 10/1998 Collins
5,819,414 A 10/1998 Marifone
5,822,866 A 10/1998 Pardue
5,890,294 A 4/1999 Keklak et al.
5,964,036 A 10/1999 Centofante
6,101,724 A 8/2000 Halligan
6,170,104 B1 1/2001 Seber et al.
6,192,589 B1 2/2001 Martone et al.
D439,492 S 3/2001 Martone et al.
6,233,769 B1 5/2001 Seber et al.
6,249,975 B1 6/2001 Lin
6,256,887 B1 7/2001 Osborne
6,276,063 B1 8/2001 Chen
6,305,085 B1 10/2001 Stallegger et al.
6,314,646 B1 11/2001 Schmidt
6,321,454 B1 11/2001 Wass
6,389,625 B1 5/2002 Rivera
6,415,514 B1 7/2002 Chun
6,430,816 B2 8/2002 Neveux
6,446,340 B1 * 9/2002 Ping ........................ B26B 5/001 30/162
6,446,341 B1 9/2002 Wang et al.
6,454,427 B1 9/2002 Chen
6,487,740 B2 12/2002 Seber et al.
6,510,767 B1 1/2003 Rivera
6,513,246 B2 2/2003 Ping
6,553,671 B2 4/2003 Blanchard
6,553,672 B2 4/2003 Glesser et al.
6,553,674 B1 4/2003 Budrow
6,574,872 B2 6/2003 Roberts et al.
6,578,221 B2 6/2003 Ping
6,591,504 B2 7/2003 Onion
6,678,958 B1 1/2004 Budrow
6,688,003 B2 2/2004 Scarla
6,688,407 B2 2/2004 Etter et al.
6,694,558 B2 2/2004 Ping
6,711,820 B2 3/2004 Chen
6,732,436 B2 5/2004 Moizis
6,735,872 B1 5/2004 Chang
6,742,260 B1 6/2004 Hsu
6,745,478 B2 6/2004 Delillo
6,763,543 B2 7/2004 Rivera
6,763,592 B2 7/2004 Yu
D494,437 S 8/2004 Scarla
D495,939 S 9/2004 Ping
6,802,094 B2 10/2004 Seber et al.
6,813,833 B2 11/2004 Saunders et al.
6,829,827 B2 12/2004 Tseng
6,845,561 B2 1/2005 Timson
6,845,694 B2 1/2005 Ping
D501,782 S 2/2005 Ping
6,862,764 B2 3/2005 Ping
6,877,229 B2 4/2005 Sakai
6,886,257 B2 5/2005 Chih
6,915,577 B2 7/2005 Scala
D510,250 S 10/2005 Ping
6,951,055 B1 10/2005 Collins
6,957,491 B2 10/2005 Van Deursen et al.
6,968,622 B2 11/2005 Ping
6,990,702 B2 1/2006 Rivera
7,000,323 B1 2/2006 Hatcher
D516,403 S 3/2006 Ping
D517,893 S 3/2006 Ping
7,007,392 B2 3/2006 Ping
D519,019 S 4/2006 Ping
7,040,022 B2 5/2006 Ping
7,051,627 B2 5/2006 Rivera
D523,317 S 6/2006 Ryan et al.
7,055,407 B2 6/2006 Gringer et al.
7,059,053 B2 6/2006 Sakai
D524,138 S 7/2006 Chih
7,080,423 B2 7/2006 Seber et al.
D526,878 S 8/2006 Ping
D528,895 S 9/2006 Ping
7,107,685 B1 9/2006 Anderson
7,107,686 B2 9/2006 Linn et al.
7,121,005 B2 10/2006 Hughes
7,131,204 B2 11/2006 Brown et al.
7,134,207 B2 11/2006 Ping
7,181,849 B2 2/2007 Menter
7,185,435 B1 3/2007 Tseng
D539,628 S 4/2007 Ping
D541,128 S 4/2007 Farland
D545,165 S 6/2007 Ping
7,231,718 B2 6/2007 Outen
D552,955 S 10/2007 Ping
D553,467 S 10/2007 Ryan
7,278,213 B2 10/2007 Pardue et al.
7,284,329 B1 10/2007 King
7,293,360 B2 11/2007 Steigerwalt et al.
7,296,354 B2 11/2007 Van Deursen et al.
7,302,760 B2 12/2007 Lake
7,305,729 B2 12/2007 Dehner
7,305,768 B2 12/2007 Hinderer
7,313,866 B2 1/2008 Linn et al.
7,316,070 B2 1/2008 Green
7,325,312 B1 2/2008 Janich

(56) References Cited

U.S. PATENT DOCUMENTS 7,346,988 B2 3/2008 Gringer et al.
D566,222 S 4/2008 Hawk et al.
D568,136 S 5/2008 Ping
7,367,089 B2 5/2008 Cooke et al.
7,380,341 B2 6/2008 Ping
7,389,587 B2 6/2008 Di Bitonto et al.
7,409,766 B2 8/2008 Steigerwalt
D581,240 S 10/2008 Glesser et al.
7,437,822 B2 10/2008 Flagg et al.
7,451,545 B2 11/2008 Voros
D583,899 S 12/2008 MacNair et al.
D584,123 S 1/2009 Lopano
D584,125 S 1/2009 Ping
D584,377 S 1/2009 MacNair et al.
7,480,997 B2 1/2009 Ping
D588,433 S 3/2009 van Deursen
7,513,045 B2 4/2009 Kain
D592,034 S 5/2009 Huang
D593,838 S 6/2009 Williams
D596,914 S 7/2009 Huang
7,555,839 B2 7/2009 Koelewyn
7,565,747 B2 7/2009 Cobb et al.
D599,433 S 9/2009 Zore
7,634,858 B1 12/2009 Frazer
D607,707 S 1/2010 Huang
7,647,701 B1 1/2010 Mollick
7,676,932 B2 3/2010 Grice
7,698,821 B2 4/2010 Ralph
7,739,799 B2 6/2010 Van Deursen
7,748,122 B2 7/2010 Duey
7,752,759 B2 7/2010 Perreault
7,774,940 B2 8/2010 Frank
7,797,836 B2 9/2010 Ranieri et al.
7,814,664 B2 * 10/2010 LeBlanc ................. B26B 1/042
30/330
D629,274 S 12/2010 Wu
7,913,397 B2 3/2011 van Deursen
7,946,201 B2 5/2011 Frazer
7,979,990 B2 7/2011 Hawk et al.
7,987,602 B2 8/2011 Kanemoto et al.
8,006,389 B2 8/2011 Jennings et al.
8,028,419 B2 10/2011 VanHoy
8,069,569 B2 12/2011 Brown et al.
8,099,870 B1 1/2012 Ralph
8,099,871 B2 1/2012 Bilenski
8,112,894 B2 2/2012 Caswell
8,171,645 B2 3/2012 Duey
8,161,653 B2 4/2012 Nenadic
8,186,065 B2 5/2012 Onion
8,201,336 B2 6/2012 De
8,220,161 B2 7/2012 Chang
8,286,356 B1 10/2012 Mollick et al.
8,375,589 B2 2/2013 Bremer et al.
8,413,337 B2 4/2013 Price
8,549,754 B2 10/2013 Bung et al.
8,567,070 B2 10/2013 Rowlay et al.
8,572,850 B2 11/2013 Wu
D696,567 S 12/2013 Leh et al.
8,621,753 B2 1/2014 Price
8,646,184 B2 2/2014 Westerfield
D703,510 S 4/2014 Hyma
D703,590 S 4/2014 Futschik et al.
8,683,703 B2 4/2014 Rowlay et al.
8,793,881 B2 8/2014 Rowlay et al.
8,793,882 B2 8/2014 Kanemoto et al.
8,813,367 B1 8/2014 Linn
8,904,649 B2 12/2014 Garavaglia et al.
8,959,779 B2 2/2015 Wen
D741,680 S 10/2015 Hunter et al.
9,550,301 B2 1/2017 Kanemoto et al.
9,656,398 B2 5/2017 Wang
10,046,466 B2 * 8/2018 Wang ...................... B26B 1/042
10,144,139 B2 * 12/2018 Squiers ..................... B26B 5/00
2002/0029480 A1 3/2002 Lin
2002/0066187 A1 6/2002 Jennings
2002/0157260 A1 10/2002 Cheng
2003/0037444 A1 2/2003 Chunn
2003/0213133 A1 11/2003 Hanna
2004/0103541 A1 6/2004 Scarla
2004/0107585 A1 6/2004 Heimrich
2004/0154170 A1 8/2004 Kain
2005/0022390 A1 2/2005 Whitemiller
2005/0044717 A1 3/2005 Tomio
2005/0150115 A1 7/2005 Hanna
2005/0155226 A1 7/2005 Van Deursen et al.
2005/0172497 A1 8/2005 Linn et al.
2005/0193566 A1 9/2005 Brown et al.
2005/0223562 A1 10/2005 Pardue
2005/0223567 A1 10/2005 Cobb et al.
2005/0283983 A1 12/2005 Huang
2006/0005397 A1 1/2006 Steigerwalt
2006/0008041 A1 1/2006 Kim et al.
2006/0026844 A1 2/2006 Ping
2006/0053631 A1 3/2006 Fossella
2006/0080841 A1 4/2006 Hatcher et al.
2006/0137190 A1 6/2006 Van Deursen et al.
2007/0056169 A1 3/2007 Cheng
2007/0169353 A1 7/2007 Wu
2007/0169354 A1 7/2007 Ralph
2007/0214652 A1 9/2007 Ping
2007/0256304 A1 11/2007 Pardue et al.
2007/0294895 A1 12/2007 Ping
2007/0294896 A1 12/2007 Brown et al.
2008/0086895 A1 4/2008 Parks
2008/0110028 A1 5/2008 Seber et al.
2008/0110029 A1 5/2008 Ryan et al.
2008/0172830 A1 7/2008 Zeng
2008/0172884 A1 7/2008 Cheng
2008/0201953 A1 8/2008 Bremer et al.
2008/0216326 A1 9/2008 Klecker et al.
2008/0235954 A1 10/2008 Radle
2008/0250650 A1 10/2008 Seber et al.
2008/0276462 A1 11/2008 Kao
2008/0301907 A1 12/2008 Chunlung
2008/0301949 A1 12/2008 Enga et al.
2009/0013537 A1 1/2009 Kao
2009/0217533 A1 9/2009 Kao
2009/0255127 A1 10/2009 Seymour et al.
2010/0175267 A1 7/2010 Seber et al.
2010/0180449 A1 7/2010 Van Deursen
2010/0281696 A1 11/2010 Hao
2011/0067246 A1 3/2011 Perez
2012/0023753 A1 2/2012 Wen
2012/0066910 A1 3/2012 Shantha
2012/0144677 A1 6/2012 Chang
2012/0159789 A9 6/2012 Frazer
2012/0174412 A1 7/2012 Ho
2012/0234142 A1 9/2012 Onion
2012/0304472 A1 12/2012 Medhurst
2013/0255002 A1 10/2013 Keers et al.
2013/0255087 A1 10/2013 Wang
2014/0373364 A1 12/2014 Li
2015/0082641 A1 3/2015 Wang
2016/0039100 A1 2/2016 Wang
2016/0288344 A1 10/2016 Squiers et al.
2018/0354144 A1 12/2018 LeBlanc et al.
2019/0077032 A1 3/2019 Squiers et al.

FOREIGN PATENT DOCUMENTS

CN 201055994 5/2008
CN 201154485 Y 11/2008
CN 201669709 12/2010
CN 202271393 U 6/2012
CN 102672730 A 9/2012
CN 202556414 U 11/2012
CN 102806567 12/2012
CN 202592392 U 12/2012
CN 202622836 U 12/2012
CN 106042007 A 10/2016
CN 207245107 U 4/2018

(56) References Cited

FOREIGN PATENT DOCUMENTS

| | | | |
|---|---|---|---|
| EP | 100377 | B1 | 9/1987 |
| TW | 201325848 | | 7/2013 |

OTHER PUBLICATIONS

Notice of Allowance from the United States Patent and Trademark Office for U.S. Appl. No. 29/530,349 dated Jun. 24, 2016 (9 pages).

Milwaukee Fastback(TM) Flip Utility Knife. Downloaded at http://grainer.com/Grainger/MILWAUKEE-Flip-Utility-Knife- 6CMY2 on Jun. 8, 2012 (2 pages).

International Search Report and Written Opinion for International Application No. PCT/CN2021/078368, dated Apr. 27, 2021, 11 pages.

* cited by examiner

KNIFE WITH BLADE STORAGE

CROSS-REFERENCE TO RELATED PATENT APPLICATION

The present application is a continuation of International Application No. PCT/CN2021/078368 filed on Mar. 1, 2021, which claims the benefit of and priority to U.S. Provisional Application No. 62/986,134, filed on Mar. 6, 2020, which are incorporated herein by reference in their entireties.

BACKGROUND OF THE INVENTION

The present invention relates generally to the field of knives. The present invention relates specifically to a knife, such as a folding knife, that includes a storage location for one or more replacement blades.

SUMMARY OF THE INVENTION

One embodiment of the invention relates to knife, such as a utility knife, including a handle, a liner coupled to the handle, a first blade with a cutting edge, a blade holder coupled to the first blade and pivotal with respect to the handle, and a second blade. The handle includes a pair of handle members opposite each other, with a handle cavity defined between the pair of handle members. The blade holder is pivotal with respect to the handle between an extended position where the cutting edge of the first blade is exposed and configured to cut a work-piece and a folded position where the cutting edge of the first blade is within the handle cavity. The liner is between the pair of handle members (e.g., within the handle cavity) and includes a spring arm that is movable between a locked position and an unlocked position. The second blade interfaces with the spring arm of the liner, such as via a notch defined by the second blade. The interface between the spring arm and the second blade restrains the second blade from being removed from the handle cavity when the spring arm is in the locked position. When the spring arm is moved into the unlocked position the spring arm no longer interfaces with the second blade and the second blade is removable from the handle cavity.

In a specific embodiment the liner comprises a body that defines a plane, and the spring arm extends laterally from the liner body such that the spring arm is not coplanar with the liner body when the spring arm is in the locked position. When the spring arm is moved from the locked position towards the unlocked position the spring arm is moved in a direction towards being coplanar with the liner body. In a specific embodiment the spring arm defines a U-shaped projection and the notch defines a U-shaped cutout, and the U-shaped projection interfaces against the U-shaped cutout when the spring arm is in the locked position.

Another embodiment of the invention relates to a utility knife including a handle having an interior surface defining a handle cavity and a liner coupled to the handle. The liner is disposed at least partially within the handle cavity. The liner includes a spring arm movable between a locked position and an unlocked position. The utility knife includes a first blade including a cutting edge. The utility knife includes a blade holder coupled to the first blade. The blade holder is pivotable with respect to the handle between an extended position where the cutting edge of the first blade is exposed and configured to cut a work-piece and a folded position where the cutting edge of the first blade is within the handle cavity. The utility knife includes a second blade that interfaces with the spring arm. The interface between the spring arm and the second blade restrains the second blade from being removed from the handle cavity when the spring arm is in the locked position. The second blade is removable from the handle cavity when the spring arm is in the unlocked position.

Another embodiment of the invention relates to a utility knife including a handle having an interior surface defining a handle cavity and a liner coupled to the handle. The liner is disposed at least partially within the handle cavity. The utility knife includes a first blade including a cutting edge. The utility knife includes a blade holder coupled to the first blade. The blade holder is pivotable with respect to the handle between an extended position where the cutting edge of the first blade is exposed and configured to cut a work-piece and a folded position where the cutting edge of the first blade is within the handle cavity. The utility knife includes a second blade including a first notch that interfaces with the liner. The interface between the liner and the first notch restrains the second blade from being removed from the handle cavity.

Another embodiment of the invention relates to a utility knife including a handle having an interior surface defining a handle cavity and a liner coupled to the handle. The liner is disposed at least partially within the handle cavity. The liner includes a body and a biasing element that extends laterally from the body. The biasing element is movable between a locked position and an unlocked position. The utility knife includes a first blade including a cutting edge. The utility knife includes a blade holder coupled to the first blade. The blade holder is pivotable with respect to the handle between an extended position where the cutting edge of the first blade is exposed and configured to cut a work-piece and a folded position where the cutting edge of the first blade is within the handle cavity. The utility knife includes a second blade that interfaces with the biasing element. The interface between the biasing element and the second blade restrains the second blade from being removed from the handle cavity when the biasing element is in the locked position. The second blade is removable from the handle cavity when the biasing element is in the unlocked position.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various views of a knife, shown as a foldable knife, are depicted. In one embodiment, the knife includes a blade holder coupled to a blade. The knife also includes a liner that restrains a replacement blade, such as in a storage cavity within the handle. When the active or used blade (e.g., the blade coupled to the blade holder) gets too worn or breaks, the user can quickly obtain a replacement blade within the knife itself and replace the worn or broken blade with the replacement blade by attaching the replacement blade to the blade holder. The liner securely restrains the replacement blade within the storage cavity of the knife while the knife is in use. An interface for actuating the liner permits a user to easily remove the replacement blade for use when needed.

Figure 1:
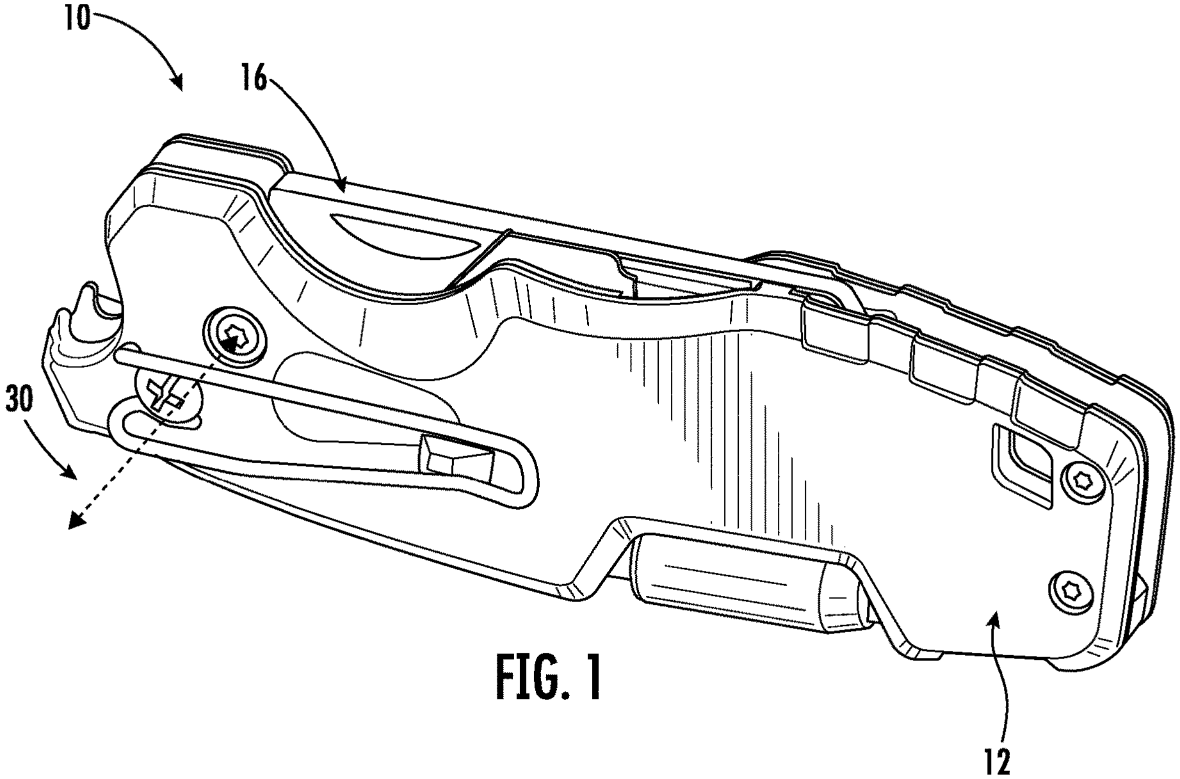
FIG. 1 is a perspective view of a knife, according to an embodiment.
Figure 2:
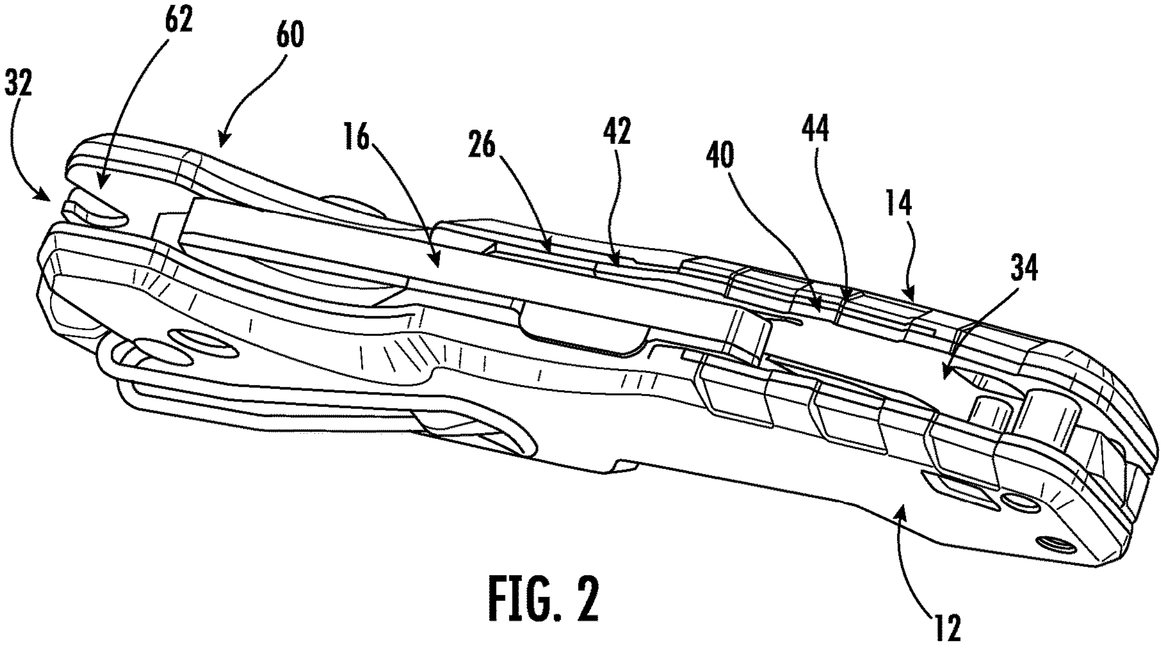
FIG. 2 is another perspective view of the knife of FIG. 1.
Figure 3:
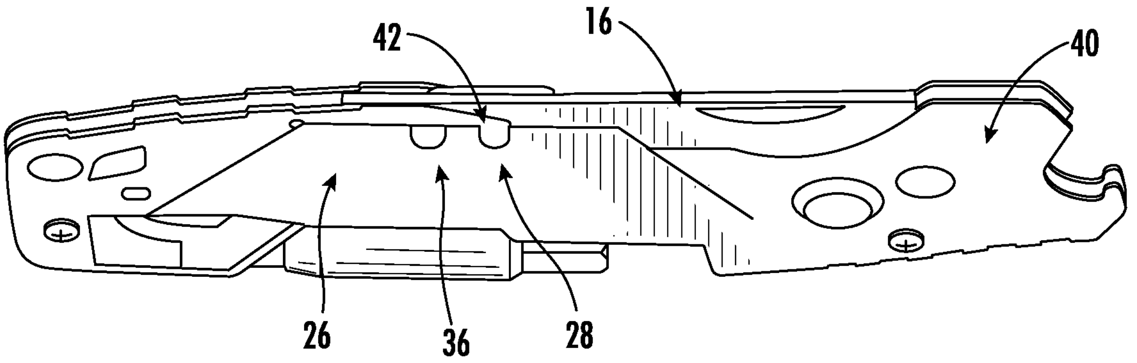
FIG. 3 is a perspective view of several components of the knife of FIG. 1.
Figure 4:
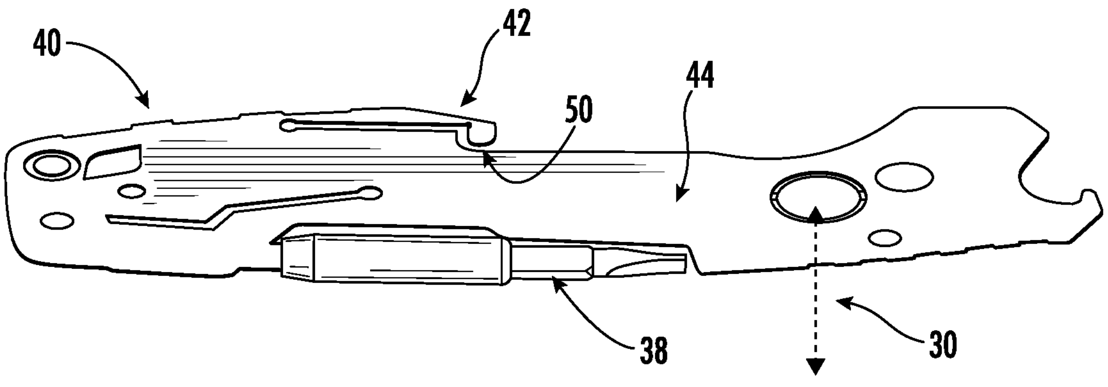
FIG. 4 is a perspective view of several components of the knife of FIG. 1.

Referring to FIGS. 1-2, a cutting device, folding knife and/or utility knife, such as knife 10, is shown according to an exemplary embodiment. Knife 10 includes handle 60 having an interior surface 62 defining handle cavity 32. In a specific embodiment, handle 60 includes opposing first and second handle members, shown as first elongate side handle member 12 and second elongate side handle member 14. In a specific embodiment first elongate side handle member 12 and second elongate side handle member 14 are coupled together. Blade holder 16 is pivotally coupled to first and second handle members 12, 14 and rotates about axis 30 with respect to first and second handle members 12, 14. First handle member 12 and second handle member 14 collectively define handle cavity 32. Blade holder 16 pivots into and out of handle cavity 32 via slot 34 on the top of first and second handle members 12, 14.

Liner 40 is coupled to first and second handle members 12, 14 and is disposed at least partially disposed within handle cavity 32 between first and second handle members 12, 14. Liner 40 includes a biasing element, shown as spring arm 42, which extends laterally from body 44 of liner 40.

Spring arm 42 is movable between a locked position and an unlocked position. In the locked position, spring arm 42 interfaces with a second blade, shown as stored blade 26. In a specific embodiment, liner 40 interfaces with notch 28 of stored blade 26 and more particularly spring arm 42 interfaces with stored blade 26. The interface between spring arm 42 and stored blade 26 restrains stored blade 26 from being removed from handle cavity 32 when spring arm is in the locked position, and stored blade 26 is removable from handle cavity 32 when spring arm 42 is in the unlocked position. In a specific embodiment, stored blade 26 includes notch 28, and spring arm 42 interfaces with notch 28 of stored blade 26. In a specific embodiment, stored blade 26 is disposed between second handle member 14 and liner 40.

Turning to FIGS. 3-6, stored blade 26 defines notch 28 and notch 36, shown as cutouts. Spring arm 42 interfaces against notch 28 to restrain stored blade 26 within handle cavity 32 when spring arm 42 is in the locked position, such as by end surface 50 of spring arm 42 interfacing against notch 28. A supplemental hand tool, shown as flathead screwdriver 38, is detachably coupled to knife 10. Flathead screwdriver 38 is configured to decouple active blade 18 from blade holder 16 and subsequently couple stored blade 26 to blade holder 16 after stored blade 26 has been removed from handle cavity 32.

Figure 5:
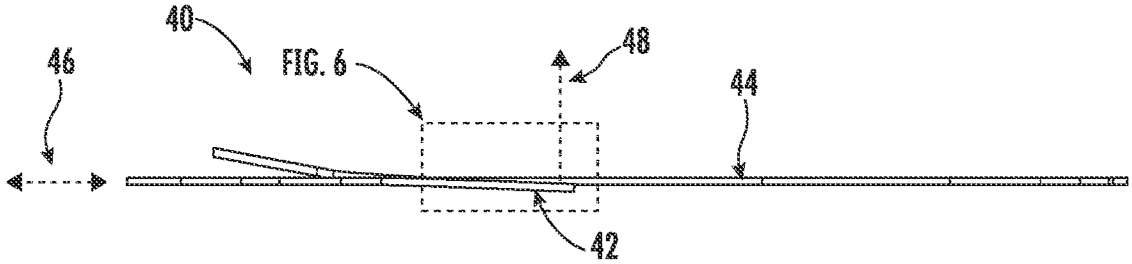
FIG. 5 is a top view of a liner of the knife of FIG. 1.
Figure 6:
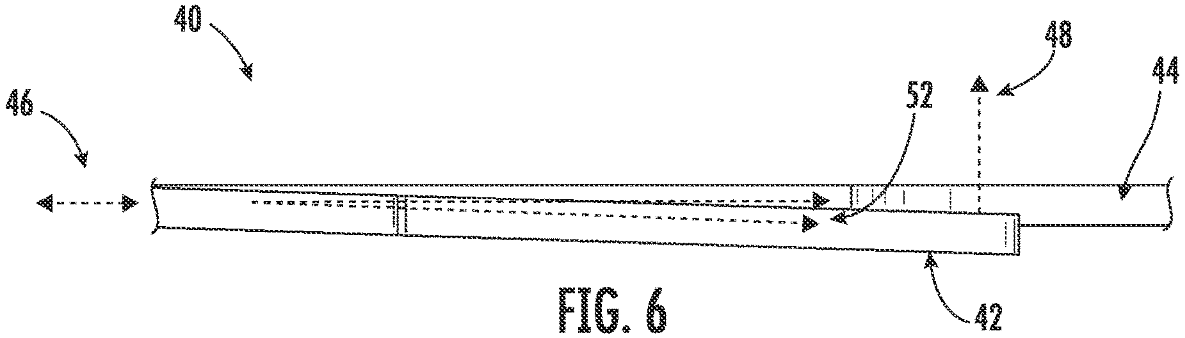
FIG. 6 is a detailed top view of the liner of FIG. 5.

Turning to FIGS. 5-6 in particular, liner 40 includes body 44 that defines plane 46. Spring arm 42 extends laterally from body 44 such that spring arm 42 is not coplanar with plane 46. As shown in FIGS. 5-6, spring arm 42 defines an angle 52 with respect to plane 46. When spring arm 42 is in the locked position, spring arm 42 defines a non-zero angle 52 with respect to plane 46. When spring arm 42 is actuated and/or transitioned from the locked position to the unlocked position, spring arm 42 is moved in direction 48, and angle 52 between spring arm 42 and plane 46 is decreased. In a specific embodiment, spring arm 42 moves away from second handle member 14 when spring arm 42 moves in direction 48 and transitions from the locked position to the unlocked position.

Figure 7:
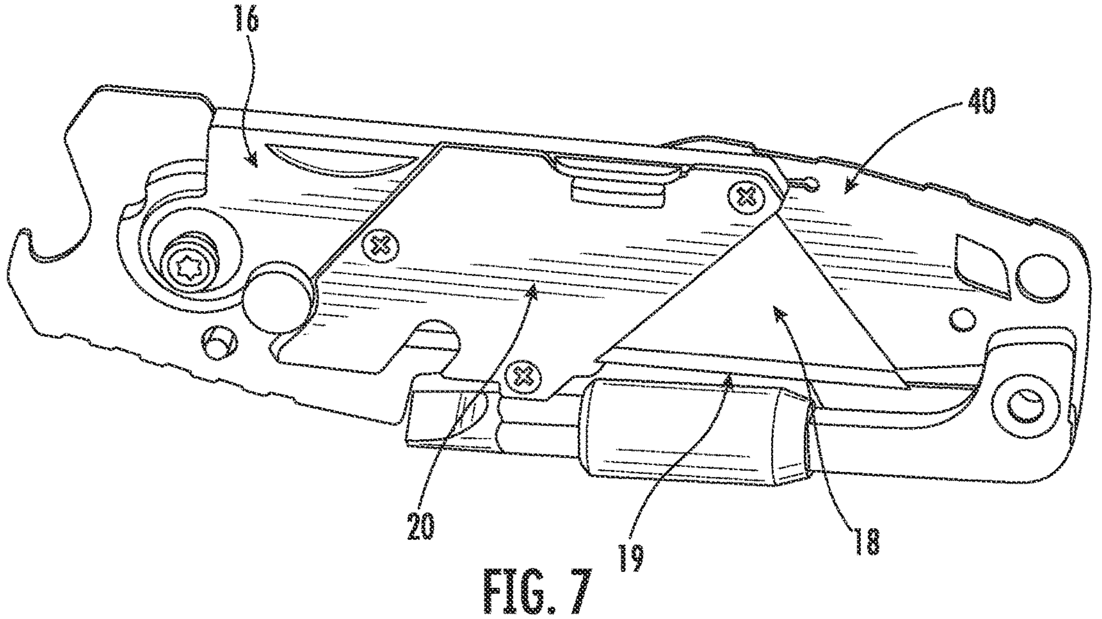
FIG. 7 is a perspective view of a liner and blade holder of the knife of FIG. 1.

Turning to FIG. 7, depicted therein is blade holder 16 coupled to a first blade, shown as active blade 18, via plate 20. Blade holder 16 is pivotally coupled to first and second handle members 12, 14. Blade holder 16 is rigidly coupled to active blade 18, such as via fasteners that secure plate 20 to blade holder 16, thereby securing active blade 18. Active blade 18 includes cutting edge 19. Blade holder 16 is pivotable with respect to handle 60 between an extended position where the cutting edge 19 of the active blade 18 is exposed and configured to cut a work-piece and a folded position where the cutting edge 19 of the active blade 18 is within the handle cavity 32.

In use, blade holder 16 is pivotal with respect to the first and second handle members 12, 14 between an extended position where cutting edge 19 of active blade 18 is exposed and configured to cut a work-piece, and a folded position where cutting edge 19 of active blade 18 is not exposed (e.g., within handle cavity 32). Blade holder 16 pivots from the extended position to the folded position via pivoting through slot 34 on top side of first and second elongate side handle members 12, 14 and into handle cavity 32.

In a specific embodiment, notches 28, 36 each define a U-shaped cutout. In a specific embodiment, notches 28, 36 are recesses rather than cutouts.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A utility knife comprising:

a handle having a top, a bottom opposing the top, and an interior surface defining a handle cavity, the cavity connected to a slot on the top of the handle;

a liner coupled to the handle, the liner disposed at least partially within the handle cavity, the liner comprising a spring arm comprising a distal end extending in a direction opposing the slot, the spring arm movable laterally relative to the handle between a locked position and an unlocked position;

a first blade comprising a cutting edge;

a blade holder coupled to the first blade, the blade holder pivotable with respect to the handle and through the slot between an extended position where the cutting edge of the first blade is exposed and configured to cut a work-piece and a folded position where the cutting edge of the first blade is within the handle cavity; and a second blade that comprises a notch, wherein the distal end of the spring arm comprises a curved surface and the curved surface interfaces with the notch, wherein the interface between the spring arm and the second blade restrains the second blade from being removed from the handle cavity when the spring arm is in the locked position, and wherein the second blade is removable from the handle cavity when the spring arm is in the unlocked position.

2. The utility knife of claim 1, the liner comprises a body defining a plane, wherein the spring arm is not coplanar with the body such that the spring arm defines a non-zero angle with respect to the plane of the body when the spring arm is in the locked position.

3. The utility knife of claim 2, wherein the angle defined between the spring arm and the plane of the body is decreased when the spring arm is transitioned from the locked position towards the blade holder and into the unlocked position.

4. The utility knife of claim 1, the second blade comprises a recess, wherein the end of the spring arm interfaces with the recess.

5. The utility knife of claim 1, the handle comprises a first elongate side handle and an opposing second elongate side handle that collectively define the handle cavity.

6. The utility knife of claim 5, wherein the spring arm moves away from the second elongate side handle when the spring arm is transitioned from the locked position towards the unlocked position.

7. The utility knife of claim 5, wherein the first elongate side handle and the opposing second elongate side handle are coupled together.

8. The utility knife of claim 1, comprising a supplemental hand tool detachably coupled to the handle, the supplemental hand tool is configured to decouple the first blade and the blade holder and couple the second blade and the blade holder.

9. The utility knife of claim 1, wherein the curved surface is concave relative to the slot.

10. A utility knife comprising:

a handle having a first elongate side, a second elongate side an opposing the first elongate side, a top, a bottom opposing the top, and an interior surface defining a handle cavity, the cavity connected to a slot on the top of the handle;

a liner coupled to the handle, the liner disposed at least partially within the handle cavity, the liner comprising:

a body defining a plane; and a spring arm comprising:

a first end connected to the body;

a second end; and a projection coupled to the second end, wherein the projection has a longitudinal axis extending from the top toward the bottom of the handle and a curved surface at a distal end of the projection, wherein the spring arm is not coplanar with the body;

a first blade comprising a cutting edge;

a blade holder coupled to the first blade, the blade holder pivotable through the slot of the handle between an extended position where the cutting edge of the first blade is exposed and configured to cut a work-piece and a folded position where the cutting edge of the first blade is within the handle cavity; and a second blade comprising a first notch that interfaces with the projection of the spring arm of the liner, wherein the interface between the spring arm of the liner and the first notch restrains the second blade from being removed from the handle cavity when the liner is in a locked position, and wherein the second blade is removable from the handle cavity when the spring arm of the liner is moved laterally away from the second elongate side into an unlocked position.

11. The utility knife of claim 10, the handle comprises a first elongate side handle and an opposing second elongate side handle that collectively define the handle cavity.

12. The utility knife of claim 11, wherein the blade holder is positioned between the first elongate side handle and the liner and the second blade is positioned between the liner and the second elongate side handle.

13. The utility knife of claim 11, wherein the first elongate side handle and the opposing second elongate side handle are coupled together.

14. The utility knife of claim 11, comprising a supplemental hand tool detachably coupled to the handle, the supplemental hand tool is configured to decouple the first blade and the blade holder and couple the second blade and the blade holder.

15. A utility knife comprising:

a handle having a top, a bottom, and an interior surface defining a handle cavity, the cavity connected to a slot on the top of the handle;

a liner coupled to the handle, the liner disposed at least partially within the handle cavity, the liner comprising:

a body; and a biasing element comprising a distal end, the distal end comprising a projection extending entirely in a direction from the top toward the bottom of the handle, the projection comprising a curved end surface, wherein the biasing element extends laterally from the body, the distal end of the biasing element movable laterally inward relative to the body between a locked position and an unlocked position;

a first blade comprising a cutting edge;

a blade holder coupled to the first blade, the blade holder pivotable through the slot at the top of the handle between an extended position where the cutting edge of the first blade is exposed and configured to cut a work-piece and a folded position where the cutting edge of the first blade is within the handle cavity; and a second blade that interfaces with the distal end of the biasing element, wherein the interface between the biasing element and the second blade restrains the second blade from being removed from the handle cavity when the biasing element is in the locked position, and wherein the second blade is removable from the handle cavity when the biasing element is in the unlocked position.

16. The utility knife of claim 15, wherein the body defines a plane, the biasing element defines a non-zero angle with respect to the plane of the body when the biasing element is in the locked position.

17. The utility knife of claim 16, wherein the angle defined between the biasing element and the plane of the body is decreased when the biasing element is transitioned from the locked position towards the unlocked position.

18. The utility knife of claim 15, the second blade comprises a notch, wherein the distal end of the biasing element interfaces with the notch.

19. The utility knife of claim 15, the second blade comprises a recess, wherein the distal end of the biasing element interfaces with the recess.

20. The utility knife of claim 15, the handle comprises a first elongate side handle and an opposing second elongate side handle that collectively define the handle cavity, wherein the first elongate side handle and the opposing second elongate side handle are coupled together.

* * * * *